(12) United States Patent
Shi et al.

(10) Patent No.: US 6,895,188 B1
(45) Date of Patent: May 17, 2005

(54) OPTICAL SIGNAL RESHAPING TO MITIGATE POLARIZATION MODE DISPERSION

(75) Inventors: Chao-Xiang Shi, Milpitas, CA (US); Li-Ping Chen, Foster City, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/546,251

(22) Filed: Apr. 10, 2000

(51) Int. Cl.$^7$ .............................................. H04B 10/12
(52) U.S. Cl. ...................................... 398/147; 398/152
(58) Field of Search ................................ 359/122, 156, 359/161, 281, 301, 337.5, 483, 499; 385/11; 398/81, 147–150, 158, 159, 152

(56) References Cited

U.S. PATENT DOCUMENTS

| | | | | |
|---|---|---|---|---|
| 5,548,435 A | * | 8/1996 | Tahara et al. ................ | 398/195 |
| 5,710,649 A | * | 1/1998 | Mollenauer .................. | 359/123 |
| 5,784,188 A | * | 7/1998 | Nakamura et al. ........... | 359/248 |
| 5,953,138 A | * | 9/1999 | Ellis ............................. | 398/75 |
| 6,072,612 A | * | 6/2000 | Liou et al. ..................... | 398/90 |
| 6,097,529 A | * | 8/2000 | Lee et al. ..................... | 359/279 |
| 6,104,515 A | * | 8/2000 | Cao ............................. | 359/161 |
| 6,275,547 B1 | * | 8/2001 | Saeki .......................... | 375/354 |
| 6,335,819 B1 | * | 1/2002 | Cho et al. .................... | 359/333 |
| 6,421,153 B1 | * | 7/2002 | Way et al. ................... | 398/152 |
| 6,750,956 B2 | * | 6/2004 | Moeller ....................... | 356/73.1 |
| 2001/0015843 A1 | * | 8/2001 | Miyauchi et al. ............ | 359/161 |
| 2002/0015207 A1 | * | 2/2002 | Ooi et al. .................... | 359/161 |

OTHER PUBLICATIONS

Agrawal, Govind P. Fiber–Optic Communication Systems. 1997. John Wiley and Sons, Inc. second edition. pp. 13–14.*

Taga, H. et al. "Polarisation mode dispersion tolerance of 10 Gbit/s Nrz and RZ optical signals," Electronics Letters, vol. 34, No. 22, pp. 2098–2100, Oct. 29, 1998.*

R. W. Tkach, A.R. Chraplyvy, Fabrizio Forghieri, A.H. Gnauck, and R.M. Derosier, "Four–Photon Mixing and High–Speed WDM Systems," Journal of Lightwave Technology, IEEE, vol. 13 ( No. 5), p. 841–849, ( May 1995).

S.D. Personick, "Receiver Design for Digital Fiber Optic Communication Systems, I," The Bell System Technical Journal, American Telephone and Telegraph Company (United States), vol. 52 (No. 6), p. 843–874, ( Jul.–Aug., 1973).

H. Bulow, D. Schlump, J. Weber, B. Wedding, R. Heidemann, "Electronic Equalization of Fiber PMD–induced distortion at 10 Gbit/s," OFC '98 Technical Digest, p. 151–152, (1998).

Hok Yong Pua, Kumar Peddanarappagari, Benyuan Zhu, Christopher Allen, Kenneth Demarest and Rongqing Hui, "An adaptive first–order polarization–mode dispersion compensation system: theory and demonstration," (unknown publication).

* cited by examiner

*Primary Examiner*—Jason Chan
*Assistant Examiner*—Christina Y Leung

(57) ABSTRACT

A PMD mitigation system is disclosed that is comprised of an interface coupled to a control system. The interface receives an optical signal and transfers the optical signal to the control system. The control system receives the optical signal from the interface, recovers a clock signal from the optical signal, optically reshapes the optical signal using the clock signal to generate a PMD mitigated signal, and transfers the PMD mitigated signal to the interface. The interface transmits the PMD mitigated signal. The PMD mitigation system advantageously mitigates PMD in the optical signal by optically reshaping the optical signal.

13 Claims, 3 Drawing Sheets

OPTICAL SIGNAL RESHAPING TO MITIGATE POLARIZATION MODE DISPERSION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to the field of optical systems, and in particular, to an fiber optic system that mitigates polarization mode dispersion (PMD) on optical signals.

2. Description of the Prior Art

A fiber optic system transfers information by transmitting light over a fiber. The fiber optic system performance depends on how the light propagates through the fiber and is measured in terms of bit error rates (BER). Light propagation can be impaired for a number of reasons such as attenuation, fiber non-linearities, and dispersion. The demand for high-performance fiber optic systems means the effects of propagation impairments must be minimized.

Dispersion refers to the smearing or spreading out of a pulse as it propagates through a fiber. The pulse eventually spreads out enough that it overlaps with neighboring pulses causing intersymbol interference (ISI). ISI sharply increases the BER of the system. One kind of dispersion is Polarization Mode Dispersion (PMD). PMD is a key limitation to the high-speed optical systems. PMD is measured like a vector quantity, where a Differential Group Delay (DGD) is the magnitude of the vector and Principal States of Polarization (PSP) are the direction. There are two PSPs associated with PMD. The two PSPs propagate at slightly different velocities with the distribution of signal power varying with time. The different velocities cause a pulse to broaden causing PMD. PMD is a time varying stochastic effect. PMD varies in time with ambient temperature, fiber movement, and mechanical stress on the fibers. Compensating for PMD can be difficult because of the time varying nature and randomness of PMD. The amount of PMD in an optical signal must be kept at a minimum in order to keep a low BER within the fiber optic system.

FIG. 1 shows a fiber optic system 100 in the prior art that compensates for PMD in optical signals. Fiber optic system 100 includes a transmitter 102, a PMD compensation system 104, and a receiver 106. PMD compensation system 104 includes a polarization controller 120 and a feedback circuit 122. Feedback circuit 122 is comprised of a Degree-of-Polarization (DOP) analyzer 130 and a processor 132. Transmitter 102 is coupled to polarization controller 120 by a first fiber. Polarization controller 120 is coupled to DOP analyzer 130, and receiver 106 by a second fiber. DOP analyzer 130 is coupled to processor 132. Processor 132 is coupled to polarization controller 120.

In operation, transmitter 102 transmits a first optical signal to polarization controller 120 over the first fiber. Polarization controller 120 maximizes the DOP in the first optical signal to generate a second optical signal. An example of polarization controller 120 is a "fiber squeezer", which is a device that squeezes a fiber and changes the DOP in a signal by adding stress to the fiber. Polarization controller 120 transfers the second optical signal to DOP analyzer 130, and receiver 106 over the second fiber.

Feedback circuit 122 monitors the DOP of the second optical signal to ensure that the second optical signal has a maximum DOP. DOP analyzer 130 receives the second optical signal from polarization controller 120. DOP analyzer 130 measures the DOP in the second optical signal to generate a corresponding DOP measurement signal. DOP analyzer 130 transfers the DOP measurement signal to processor 132. Processor 132 processes the DOP measurement signal to determine whether the DOP in the second optical signal is at a maximum. Processor 132 generates and transfers a control signal to polarization controller 120. If the DOP in the second optical signal is at a maximum, the control signal does not alter the operation of polarization controller 120. If the DOP in the second optical signal is not at a maximum, the control signal changes the operation of polarization controller 120 to increase the DOP of the second optical signal.

Fiber optic systems need to mitigate PMD in optical signals in order to provide high-speed communications. A problem with fiber optic system 100 is that PMD compensation system 104 is complex and expensive. PMD system 104 uses feedback circuit 122 to monitor and correct system performance, and feedback circuit 122 adds complexity and cost to fiber optic system 100.

SUMMARY OF THE INVENTION

The invention solves the above problem by mitigating PMD in optical signals with a PMD mitigation system that is simpler and cheaper than the prior art. The PMD mitigation system is comprised of an interface coupled to a control system. The interface receives an optical signal and transfers the optical signal to the control system. The control system recovers a clock signal from the optical signal, optically reshapes the optical signal using the clock signal to generate a PMD mitigated signal, and transfers the PMD mitigated signal to the interface. The interface transmits the PMD mitigated signal.

In one example, the control system is comprised of a clock recovery system and a modulator. The clock recovery system receives the optical signal and recovers a clock signal from the optical signal. The clock recovery system transfers the clock signal to the modulator. The modulator receives the clock signal and the optical signal. The modulator optically reshapes the optical signal by modulating the optical signal using the clock signal to generate the PMD mitigated signal.

The PMD mitigation system advantageously mitigates PMD by optically reshaping the optical signal. The PMD mitigation system does not need a feedback circuit to monitor or correct the optical signal. The PMD mitigation system is a cheaper and simpler alternative to the prior art.

DETAILED DESCRIPTION OF THE INVENTION

Figure 1:
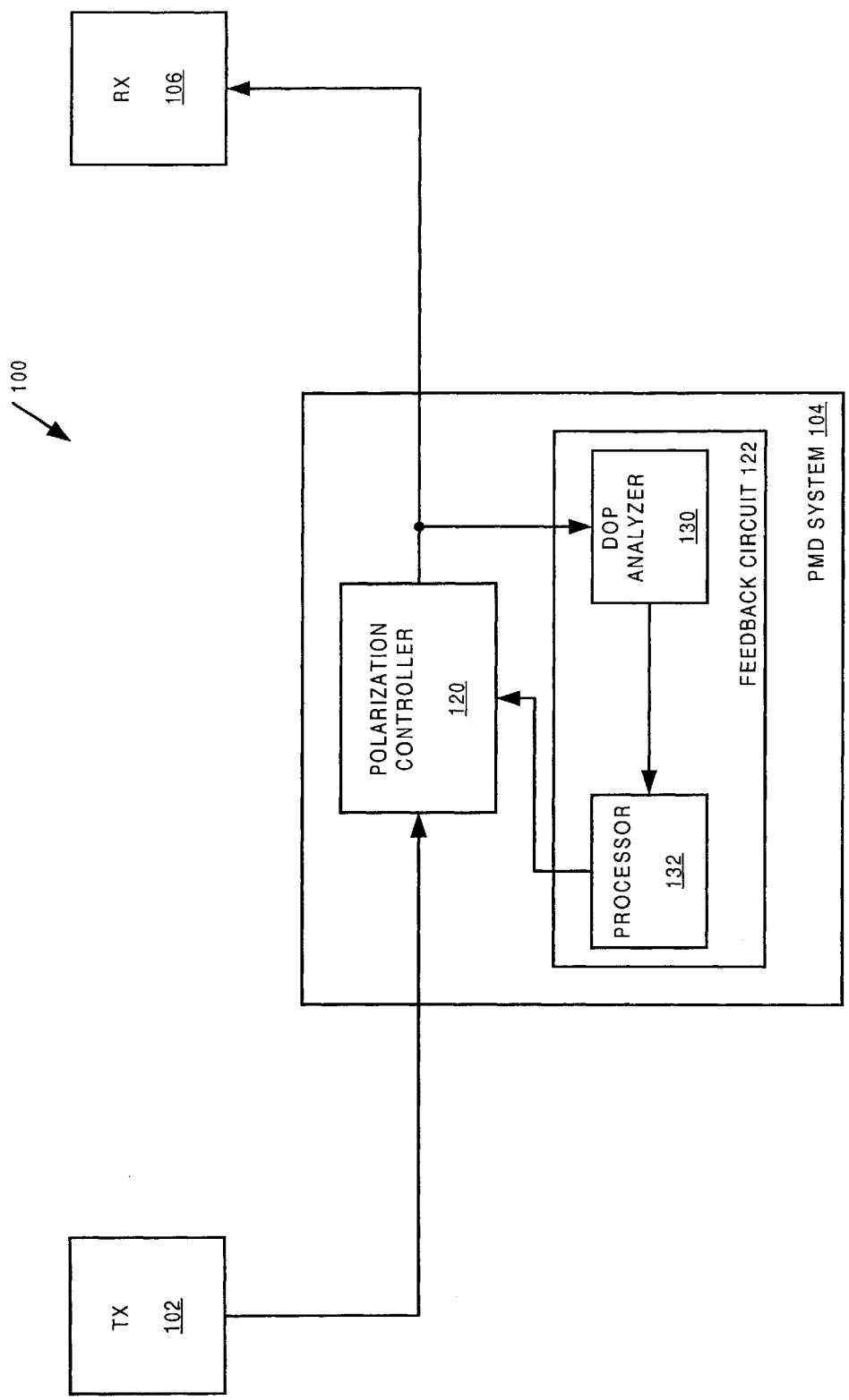
FIG. 1 is a block diagram depicting a fiber optic system including PMD compensation system in the prior art.
Figure 2:
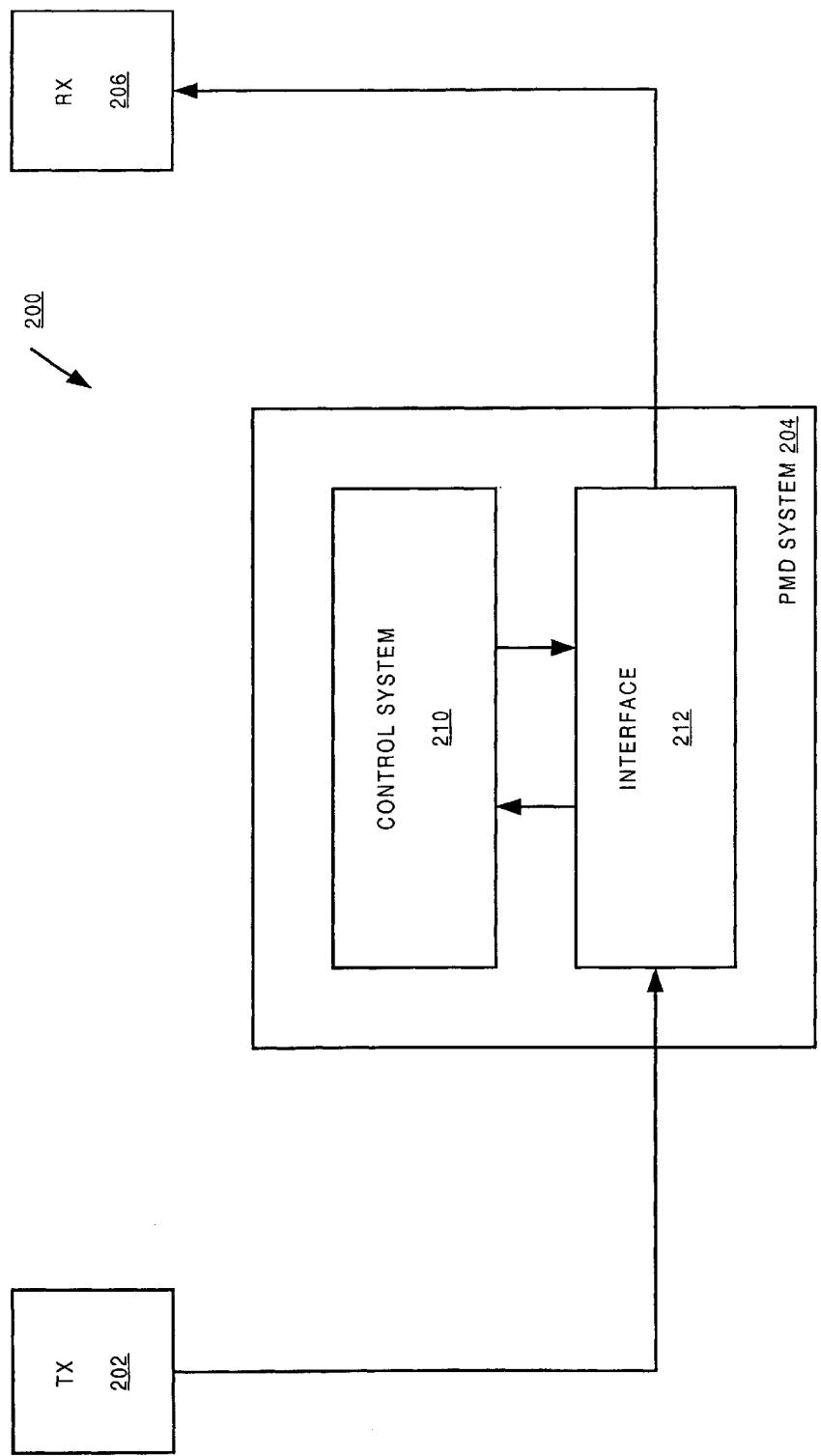
FIG. 2 is a block diagram depicting a fiber optic system including PMD mitigation system in an example of the invention.

First Fiber Optic System Configuration and Operation—FIG. 2

FIG. 2 shows an example of a fiber optic system 200 in accord with the present invention. Those skilled in the art will appreciate numerous variations from this example that do not depart from the scope of the invention. Those skilled in the art will also appreciate that various features described below could be combined to form multiple variations of the invention.

Fiber optic system 200 is comprised of a transmitter 202, a Polarization Mode Dispersion (PMD) mitigation system 204, and a receiver 206. PMD mitigation system 204 includes an interface 212 and a control system 210. Transmitter 202 is coupled to interface 212 by a first fiber. Interface 212 is coupled to control system 210, and to receiver 206 by a second fiber.

Transmitter 202 is any conventional transmitter configured to transmit an optical signal. Receiver 206 is any conventional receiver configured to receive an optical signal.

In operation, transmitter 202 transmits an optical signal to interface 212 over the first fiber. Interface 212 transfers the optical signal to control system 210. Control system 210 recovers a clock signal from the optical signal. Control system 210 then optically reshapes the optical signal using the clock signal to generate a PMD mitigated signal. Control system 210 transfers the PMD mitigated signal to interface 212. Interface 212 transmits the PMD mitigated signal to receiver 206 over the second fiber.

Fiber optic system 200 is a significant advance in the art by mitigating PMD in optical signals using PMD mitigation system 204 that is cheaper and simpler than the prior art. PMD mitigation system 204 mitigates the PMD by optically reshaping the optical signal. PMD mitigation system 204 is an advantage over the prior art by providing a cheaper and easier method of mitigating PMD in optical signals.

Figure 3:
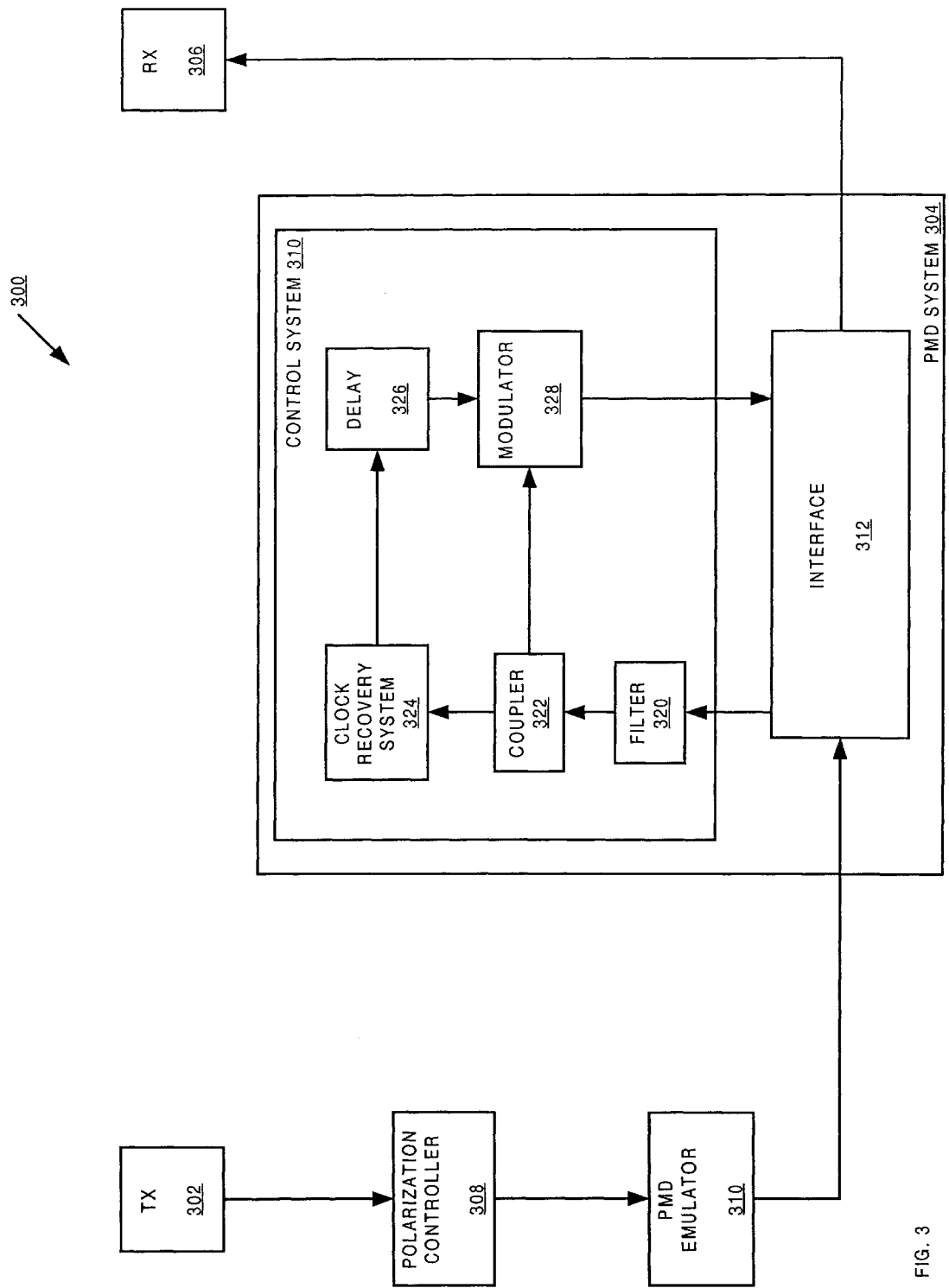
FIG. 3 is a block diagram depicting a fiber optic system including PMD mitigation system comprised of a clock recovery system and a modulator in an example of the invention.

Second Fiber Optic System Configuration and Operation—FIG. 3

FIG. 3 shows an example of fiber optic system 300 in accord with the present invention. Those skilled in the art will appreciate numerous variations from this example that do not depart from the scope of the invention. Those skilled in the art will also appreciate that various features described below could be combined with the above-described embodiment to form multiple variations of the invention.

Fiber optic system 300 is comprised of a transmitter 302, a PMD mitigation system 304, and a receiver 306. PMD mitigation system 304 includes an interface 312 and a control system 310. Control system 310 includes a filter 320, a coupler 322, a clock recovery system 324, a delay 326, and a modulator 328. Transmitter 302 is coupled to interface 312 by a first fiber. Interface 312 is coupled to filter 320, and modulator 328. Filter 320 is coupled to coupler 322. Coupler 322 is coupled to clock recovery system 324 and modulator 328. Clock recovery system 324 is coupled to delay 326. Delay 326 is coupled to modulator 328. Interface 312 is also coupled to receiver 306 by a second fiber.

Transmitter 302 is an OC-192 10 Gb/s Non-Return-to-Zero (NRZ) transmitter. Filter 320 is a tunable optical filter with a 3-dB pass-band of 0.25 nm. Coupler 322 is a 90:10 optical coupler, but for example, can be any conventional coupler configured to receive an optical signal, and transfer the optical signal over two fibers. Delay 326 is a tunable Radio Frequency (RF) delay. Modulator 328 can be an electro-absorption modulator that is relatively polarization insensitive, or a wavelength converter.

In operation, transmitter 302 transmits an optical signal to interface 312 over the first fiber. The optical signal is an NRZ signal. Interface 312 transfers the optical signal to filter 320. Filter 320 filters the optical signal to reduce noise. Filter 320 transfers the optical signal to coupler 322. Coupler 322 splits the optical signal and transfers the optical signal to clock recovery system 324 and modulator 328. Those skilled in the art will understand that coupler 322 could transfer a selected frequency range of the optical signal to clock recovery system 324. Those skilled in the art will also understand that coupler 322 may be included within clock recovery system 324.

Clock recovery system 324 receives the optical signal from coupler 322. Clock recovery system 324 recovers a 10-GHz sinusoidal clock signal from 10% of the optical signal. Those skilled in the art will appreciate that there are numerous ways to recover the clock signal from the optical signal. For instance, an optical coupler could be used to separate out 10% of the optical signal. Then an optical filter could be used to separate the clock signal out of the 10% of the optical signal. Clock recovery system 324 transfers the clock signal to delay 326. Delay 326 adjusts the timing of the clock signal and transfers the clock signal to modulator 328. Delay 326 is a variable delay that is adjusted to synchronize the clock signal with the optical signal. Once delay 326 is adjusted, it typically does not need to be re-adjusted.

Modulator 328 receives the clock signal from delay 326 and the optical signal from coupler 322. Modulator 328 optically reshapes the optical signal using the clock signal to generate a PMD mitigated signal. Optically reshaping the optical signal refers to modulating the optical signal using the clock signal. The modulating takes place in the optical domain instead of the electrical domain, and the modulating of the optical signal in the optical domain acts to mitigate PMD in the optical signal. The optical reshaping also converts the optical signal from NRZ format to Return-to-Zero (RZ) format. Modulator 328 transfers the PMD mitigated signal to interface 312. Interface 312 transmits the PMD mitigated signal to receiver 306 over the second fiber.

A polarization controller 308 and a PMD emulator 310 are also shown in FIG. 3. Polarization controller 308 and PMD emulator 310 can be coupled to the first fiber to test the PMD mitigation system. Polarization controller 308 adjusts the state of polarization of the optical signal so that the optical signal is evenly distributed along two principle states of polarization (PSP). PMD emulator 310 adds PMD to the optical signal so that adequate PMD measurements can be taken from the optical signal.

Fiber optic system 300 is a significant advance in the art by mitigating PMD in optical signals using PMD system 304 that is simpler and cheaper than the prior art. Modulator 328 optically reshapes the optical signal to mitigate PMD using the clock signal. PMD system 304 is an advantage over the prior art by providing a cheaper and easier method of mitigating PMD in optical signals.

Those skilled in the art will appreciate variations of the above-described embodiments that fall within the scope of the invention. As a result, the invention is not limited to the specific examples and illustrations discussed above, but only by the following claims and their equivalents.

We claim:

1. A method of mitigating Polarization Mode Dispersion (PMD) in an optical signal, the method comprising:

receiving the optical signal having a Non-Return to Zero (NRZ) format;

recovering a clock signal from the optical signal;

optically reshaping the optical signal using the clock signal to generate a PMD mitigated signal and to convert the NRZ format of the optical signal to Return to Zero (RZ) format of the PMD mitigated signal; and transmitting the PMD mitigated signal having the RZ format.

2. The method in claim 1 further comprising filtering the optical signal.

3. The method in claim 1 further comprising synchronizing the clock signal with the optical signal.

4. The method in claim 1 wherein optically reshaping the optical signal comprises modulating the optical signal using the clock signal.

5. A Polarization Mode Dispersion (PMD) mitigation system comprising:

an interface configured to receive an optical signal having a Non-Return to Zero (NRZ) format and transmit a PMD mitigated signal having a Return to Zero (RZ) format; and a control system coupled to the interface and configured to recover a clock signal from the optical signal, optically reshape the optical signal using the clock signal to generate a PMD mitigated signal and to convert the NRZ format of the optical signal to the RZ format of the PMD mitigated signal.

6. The PMD mitigation system in claim 5 wherein the control system comprises:

a clock recovery system coupled to the interface and configured to receive the optical signal from the interface, recover the clock signal from the optical signal, and transfer the clock signal; and a modulator coupled to the clock recovery system and the interface and configured to receive the optical signal from the interface and the clock signal from the clock recovery system, optically reshape the optical signal using the clock signal to generate the PMD mitigated signal and to convert the NRZ format of the optical signal to the RZ format of the PMD mitigated signal, and transfer the PMD mitigated signal to the interface.

7. The PMD mitigation system in claim 6 wherein the modulator comprises an electro-absorption modulator.

8. The PMD mitigation system in claim 7 wherein the electro-absorption modulator is substantially polarization insensitive.

9. The PMD mitigation system in claim 6 wherein the modulator comprises a wavelength converter.

10. The PMD mitigation system in claim 6 wherein the control system further comprises a delay system coupled to the clock recovery system and configured to synchronize the clock signal with the optical signal.

11. The PMD mitigation system in claim 10 wherein the delay system comprises a Radio Frequency (RF) delay.

12. The PMD mitigation system in claim 6 wherein the control system further comprises a coupler coupled to the interface, clock recovery system, and the modulator and configured to receive the optical signal, and transfer the optical signal to the clock recovery system and the modulator.

13. The PMD mitigation system in claim 12 wherein the control system farther comprises a filter coupled to the interface and the coupler and configured to filter the optical signal.

* * * * *